United States Patent [19]

Zimowski et al.

[11] Patent Number: 5,615,337

[45] Date of Patent: Mar. 25, 1997

[54] SYSTEM AND METHOD FOR EFFICIENTLY PROCESSING DIVERSE RESULT SETS RETURNED BY A STORED PROCEDURES

[75] Inventors: Melvin R. Zimowski, San Jose; Curt L. Cotner, Gilroy, both of Calif.; Peter K. L. Shum, Richmond Hill, Canada

[73] Assignee: International Business Machines Corporation, Armonk, N.Y.

[21] Appl. No.: 417,863

[22] Filed: Apr. 6, 1995

[51] Int. Cl.⁶ .................................................. G06F 15/40
[52] U.S. Cl. ............................. 395/200.01; 364/DIG. 1; 364/242.94; 364/274.1; 364/282.1
[58] Field of Search .......................... 395/200.01, 800, 395/600, 650

[56] References Cited

U.S. PATENT DOCUMENTS

| | | | |
|---|---|---|---|
| 5,249,290 | 9/1993 | Helzer | 395/650 |
| 5,432,930 | 7/1995 | Song | 395/600 |
| 5,481,700 | 1/1996 | Thuraisingham | 395/600 |
| 5,497,463 | 3/1996 | Stein et al. | 395/200.03 |
| 5,499,360 | 3/1996 | Barbara et al. | 395/600 |

*Primary Examiner*—Mehmet B. Geckil
*Attorney, Agent, or Firm*—Marilyn Smith Dawkins; Sterne, Kessler, Goldstein & Fox P.L.L.C.

[57] ABSTRACT

A system for processing diverse and non-diverse result sets is described. The system includes a client process in a client computer system that constructs a client process execution request identifying a stored procedure and specifying constraints on the quantity of response data that the client process is capable of handling. The client process execution request is transferred from the client process in the client computer system to a server process in a server computer system. The server process invokes the stored procedure identified by the client process execution request. Execution of the stored procedure results in the generation of answer set data for a plurality of diverse query result sets. Result set generators obtain answer set data for X of the query result sets, where X is defined by the constraints. The server process then generates an initial response containing, for each of the X query result sets, an amount of the obtained answer set data consistent with the constraints. The initial response is transferred from the server computer system to the client process in the client computer system. The client application is then able to access and process answer set data for the diverse result sets in any order.

19 Claims, 10 Drawing Sheets

SYSTEM AND METHOD FOR EFFICIENTLY PROCESSING DIVERSE RESULT SETS RETURNED BY A STORED PROCEDURES

TECHNICAL FIELD

The present invention relates generally to database systems, and more particularly to the processing of diverse query result sets returned by a stored procedure that interacts with one or more data repositories.

BACKGROUND ART

Modern computer database environments often include a client computer system connected to a server computer system containing one or more data repositories (such as relational database management systems). The server computer system also has stored therein one or more stored procedures. Each stored procedure, when executed, interacts with and performs database operations (such as a database query) on one or more of the data repositories.

A client application in the client computer system communicates with the server computer system and causes one of the stored procedures to be executed. Diverse query result sets are generated as a result of such execution. These diverse query result sets are transferred from the server computer system to the client application in the client computer system.

Some database products on the market today offer facilities to return query result sets by a stored procedure, as described above. However, these database products are typically constrained in some manner.

For example, some conventional database products are limited in the number of query result sets that may be returned by any given stored procedure invocation. In particular, in some conventional database products, the stored procedures are limited to a single query result set on any given stored procedure invocation.

Other conventional database products support stored procedures that can return multiple query result sets. However, these conventional database products are limited in various ways. In particular, some of these conventional database products force the client application to fetch and process each result set in the order in which it is transmitted by the server computer system. This places artificial limitations on the client application designer, and makes it difficult to take full advantage of the data returned by the stored procedure.

Also, with some of these conventional database products, if the client application chooses to fetch a subset of the rows in a large query, the client process (which is contained in the client computer system and which operates as an interface between the client application and the server computer system) must receive and discard all the remaining rows in the query result set, before the data rows for the next query can be presented to the client application. This results in increased CPU and I/O cost to both the client computer system and the server computer system.

Further, some of these conventional database products require each result set to have the same number of columns and the same column attributes. Essentially, the result set is a union of all the result set columns. This can cause the server computer system to transmit many extra data columns that are only present to force consistent attributes for the result set.

DISCLOSURE OF INVENTION

The present invention is directed to a system and method for allowing a client application that is remotely connected to a server computer system to invoke a stored procedure and have multiple query result sets returned to the client application on a single network message exchange. The invention allows the client process supporting the client application to receive data from each result set in bursts, where the client process and server process (in the server computer system) negotiate the size of each data transmission burst. The client application can fetch data from the query result sets in any order.

The present invention provides the following advantages:

(1) A single exchange of network messages can invoke a stored procedure and return multiple output parameters as well as multiple query result sets. This allows the client application to request a wide variety of database objects, with a minimal number of network messages. Elapsed time is reduced and CPU cost is minimized, when compared to achieving the same result with multiple network message exchanges.

(2) The database queries are issued by the stored procedure on behalf of the client application. This allows the application designer to centralize DBMS access at the server, if the application designer chooses to do so.

(3) The result sets may be transmitted to the client process asynchronously, allowing the client system to overlap some of the client application processing with the server data retrieval and transmission.

(4) The client process and server process can negotiate the amount of data returned from each result set on any given network message exchange. This allows the client process to control the amount of data that might be retrieved by the server, in case the client application chooses to fetch a subset of the query result set. This negotiation also allows the client process to place limits on the amount of storage required at the client system for query result set messages.

(5) If the client process needs additional data from any of the result sets, the client process can send a message to the server process specifying the amount of additional query result set data to be returned.

(6) The client application is able to fetch the data from the query result sets in any order.

(7) The server process can obtain the data for each query result set in parallel. This parallel processing can be performed while the stored procedure runs or after the completion of the stored procedure.

(8) The server process can choose to return a portion of data (less data for a result set than the limit defined by the client process), if the server process determines that the query result is not being generated fast enough to meet end user response time expectation. This allows the server process to send part of the data to the client process, while the remaining data is fetched asynchronously.

More particularly, the present invention is directed to a system and method for processing diverse result sets. The system includes a client process in a client computer system that constructs a client process execution request identifying a stored procedure and specifying constraints on the quantity of response data that the client process is capable of handling. The client process execution request is transferred from the client process in the client computer system to a server process in a server computer system.

The server process invokes the stored procedure identified by the client process execution request. Execution of the stored procedure results in the generation of answer set data for a plurality of diverse query result sets. Result set generators asynchronously or synchronously obtain answer set data for X of the query result sets, where X is defined by the constraints. The server process then generates an initial response containing, for each of the X query result sets, an amount of the obtained answer set data consistent with the constraints. The initial response is transferred from the server computer system to the client process in the client computer system. The client application is then able to access and process answer set data from the diverse result sets in any order.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF DRAWINGS

The present invention will be described with reference to the accompanying drawings, wherein.

BEST MODE FOR CARRYING OUT THE INVENTION

Figure 1:
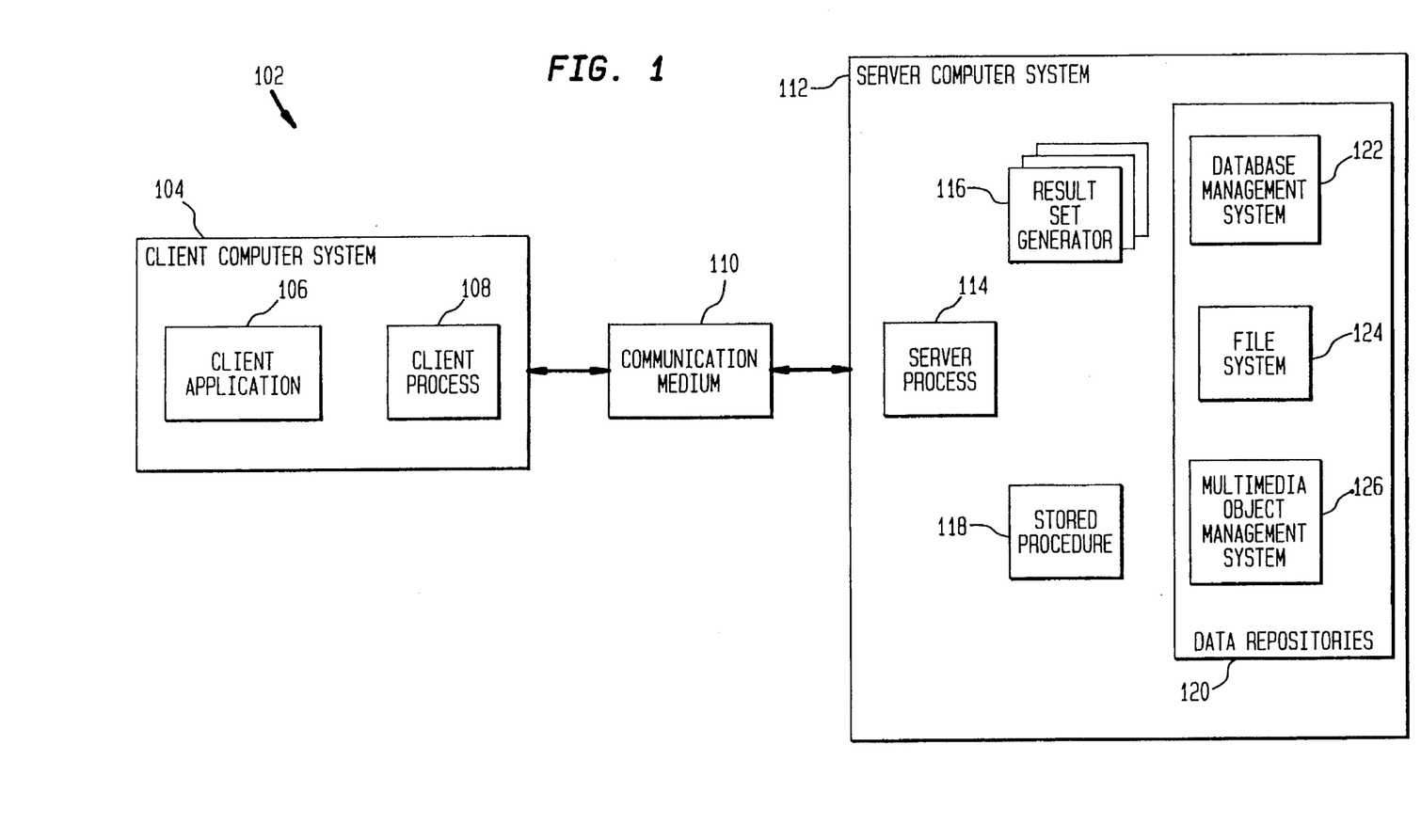
FIG. 1 is a block diagram of a computing environment according to a preferred embodiment of the present invention.

FIG. 1 is a block diagram of a computing environment 102 containing a client computer system 104 connected to a server computer system 112 via a communication medium 110. The communication medium 110 may be a communication network or a communication bus, for example. In practice, other client computer systems and server computer systems may be connected to the communication medium 110.

The client computer system 104 includes a client application 106 and a client process 108. The client application 106 represents a computer program (preferably a user-written computer program, such as a structured query language, SQL, program). executing in the client computer system 104. The client application 106 performs any user-defined functionality, and preferably interacts with the resources contained in the server computer system 112 (as described below) to achieve such functionality. The client application 106 may be, for example, a multi-media automobile insurance claims program, where automobile insurance related information is stored in the server computer system 112 (this example is described further below).

The client process 108 represents an interface (or gateway) between the client application 106 and the server computer system 112. The client process 108 processes requests from the client application 106 (and, perhaps, from other client applications not shown in FIG. 1) for access to resources not contained in the client computer system 104. The client 108 may operate continuously as a background process, or may be instantiated and executed on an as-needed basis.

The server computer system 112 includes a server process 114, a stored procedure 118 (in practice, the server computer system 112 may include a library of stored procedures, although a single stored procedure 118 is shown and described herein for simplicity purposes), a plurality of result set generators 116, and a plurality of data repositories 120. The server process 114 processes requests received from client devices (such as the client computer system 104) over the communication medium 110. From the perspective of such client devices, the server process 114 is an interface to the stored procedures (such as stored procedure 118) and data contained in the server computer system 112.

The stored procedure 118 is a software procedure that may be invoked by client devices (such as the client computer system 104) by sending an appropriate request to the server computer system 112 (in particular, to the server process 114) over the communication medium 110. The stored procedure 118 contains database related instructions that, when executed, cause one or more of the data repositories 120 to perform database related functions specified by the instructions. Such database related instructions include database query instructions, for example. Thus, the stored procedure 118 may include a plurality of database query instructions. Each database query instruction, when successfully executed, will result in the generation of a query result set.

The functionality of the stored procedure 118 is implementation dependent. In practice, the server computer system 112 may store a plurality of stored procedures (i.e., a library of stored procedures), where each stored procedure performs a different function. For ease of illustration and description, only one stored procedure 118 is shown in FIG. 1.

The data repositories 120 include, for example, one or more database management systems 122 (relational and/or nonrelational), one or more file systems 124, one or more multimedia object management systems 126, non-database management systems, etc. The data stored in the data repositories 120 represent resources that are desired by client devices, such as the client application 106 in the client computer system 104.

The server computer system 112 also includes a plurality of result set generators 116. The result set generators 116 are associated with the stored procedure 118, and are instantiated each time the stored procedure 118 is executed (generally speaking, a set of result set generators 116 is instantiated each time a stored procedure is executed). There is one result set generator 116 for each query result set generated by execution of the stored procedure 118. The result set generators 116 operate independently of one another, and of the stored procedure 118. Also, according to the invention, initial results can be transmitted to the client process 108 before answer set data is obtained from the data repositories 120. As a result of such independent operation, the result set generators 116 operate to transmit data from different query result sets to the client application 106 in an asynchronous manner (this is apparent from the description below). Accordingly, the result set generators 116 are also called "asynchronous" result set generators 116.

The invention also works with synchronous result set generators which operate, for example, in a synchronous fashion with the stored procedure 118 and/or the server process 114.

Figure 2:
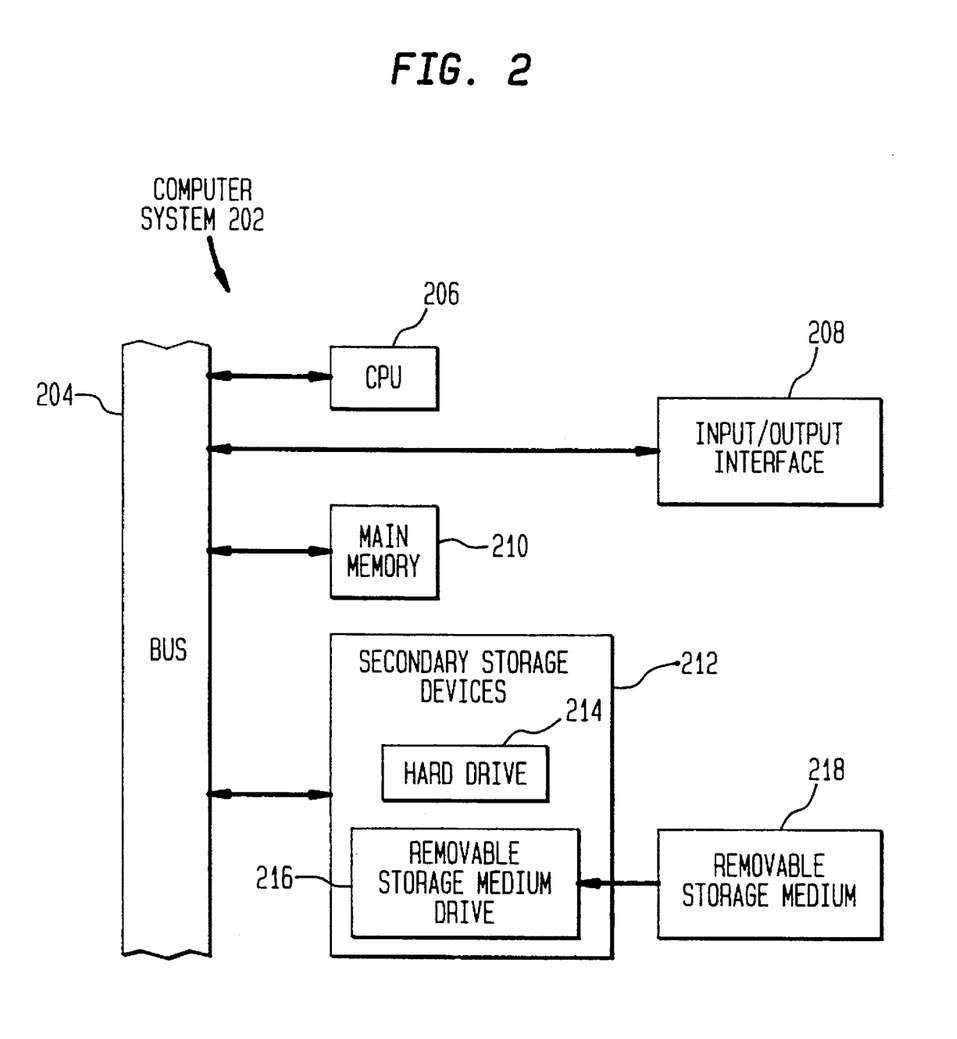
FIG. 2 is a block diagram of a computer system used to implement a client computer system and a server computer system according to the present invention.

The client computer system 104 and the server computer system 112 are each implemented using a computer system 202 as shown in block diagram form in FIG. 2. The computer system 202 includes one or more processors, such as central processing unit (CPU) 206, connected to a bus 204. Also connected to the bus 204 is a main memory 210 (preferably random access memory, RAM) and secondary storage devices 212. The secondary storage devices 212 include, for example, a hard drive 214 and a removable storage medium drive 216 (such as a disk drive, for example).

The client application 106, the client process 108, the server process 114, the stored procedure 118, and the result set generators 116 are preferably computer programs that reside in the main memories 210 of their respective computer systems 202 while executing. When executing, these computer programs enable their respective computer systems 202 to perform the features of the present invention as discussed herein. Thus, the client application 106, the client process 108, the server process 114, the stored procedure 118, and the result set generators 116 represent controllers of their respective computer systems 202.

In one embodiment, the present invention is a computer program product (such as removable storage medium 218, representing a computer storage disk, compact disk, etc.) comprising a computer readable media having control logic recorded thereon. The control logic, when loaded into main memory 210 and executed by the CPU 206, enables the CPU 206 to perform the operations described herein. This control logic represents computer programs corresponding to the client application 106, the client process 108, the server process 114, the stored procedure 118, and the result set generators 116.

OPERATION OF THE INVENTION

Figure 3A:
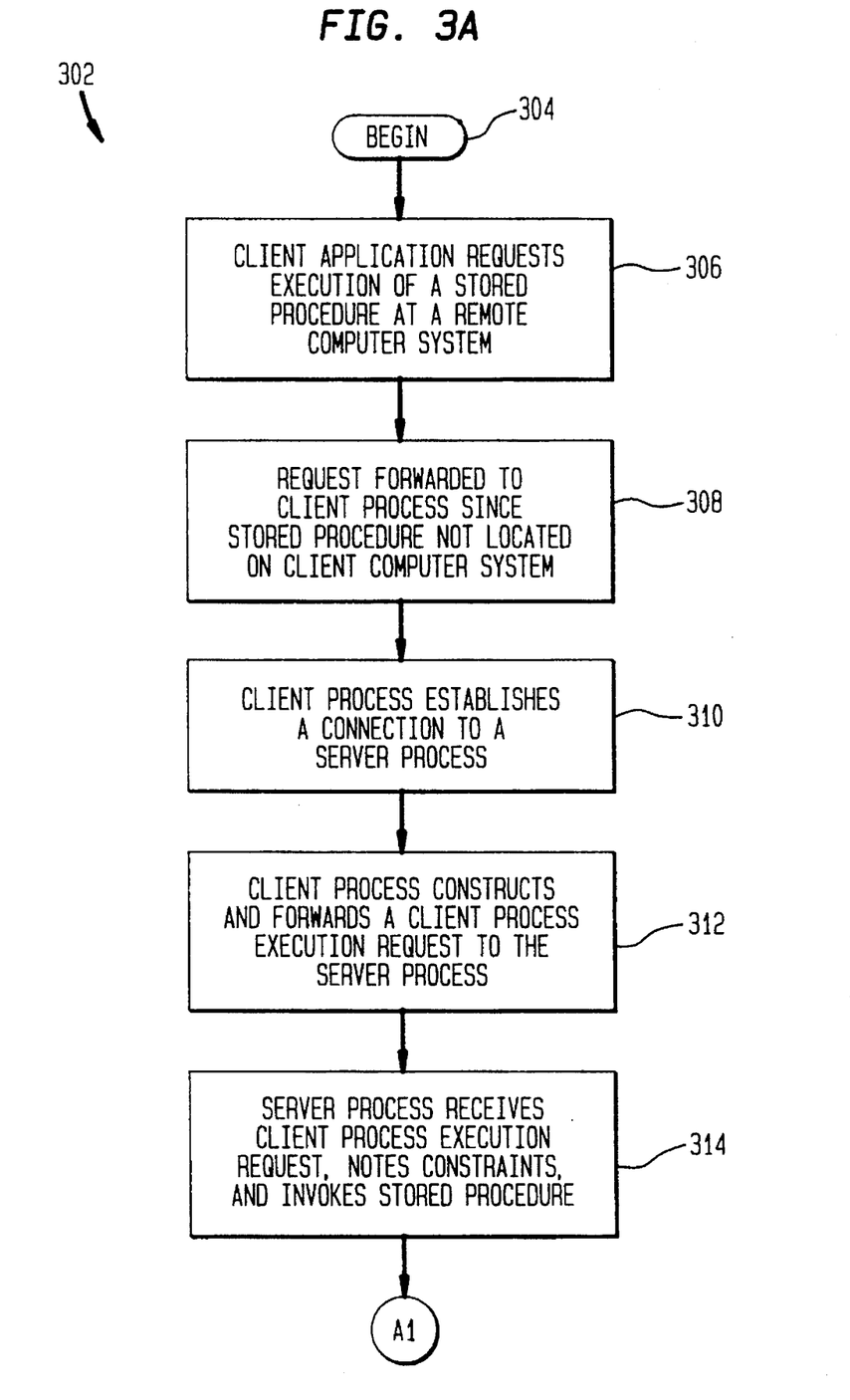
FIGS. 3A–3C and 6A–6B are flowcharts depicting the preferred operation of the present invention.
Figure 3B:
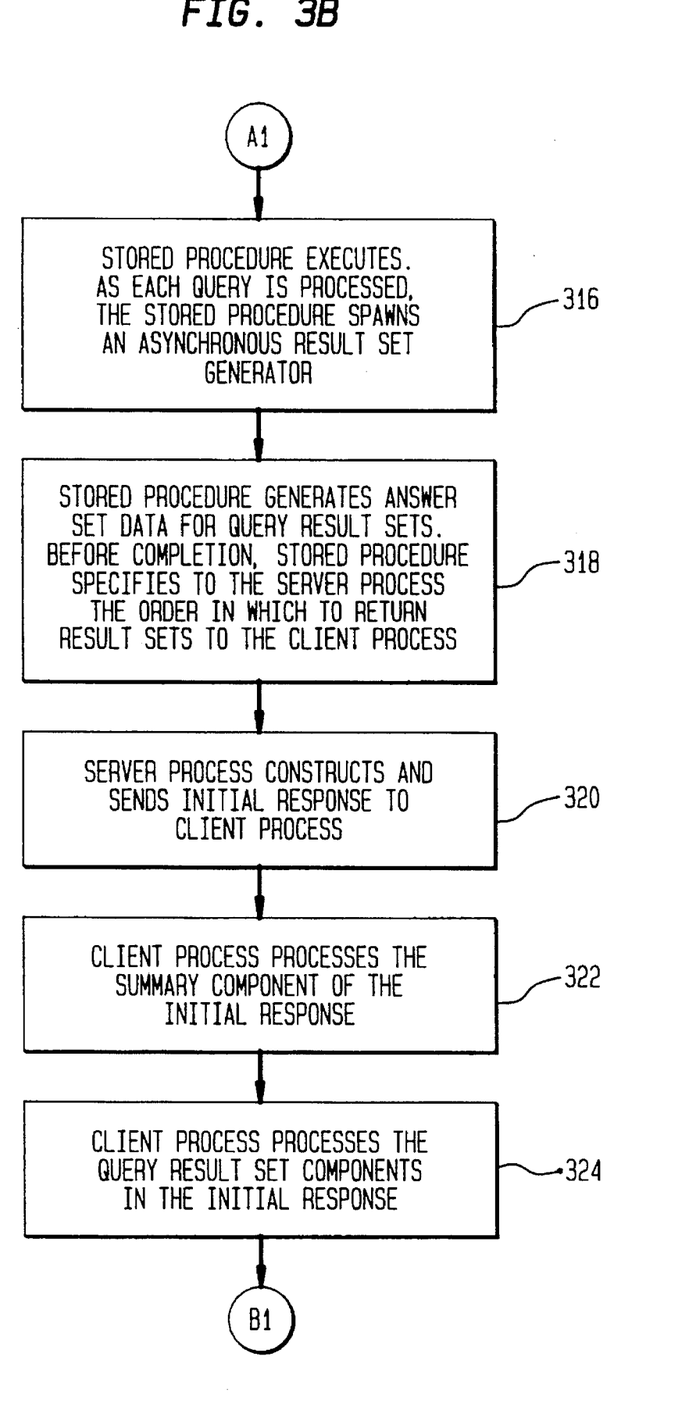
Figure 3C:
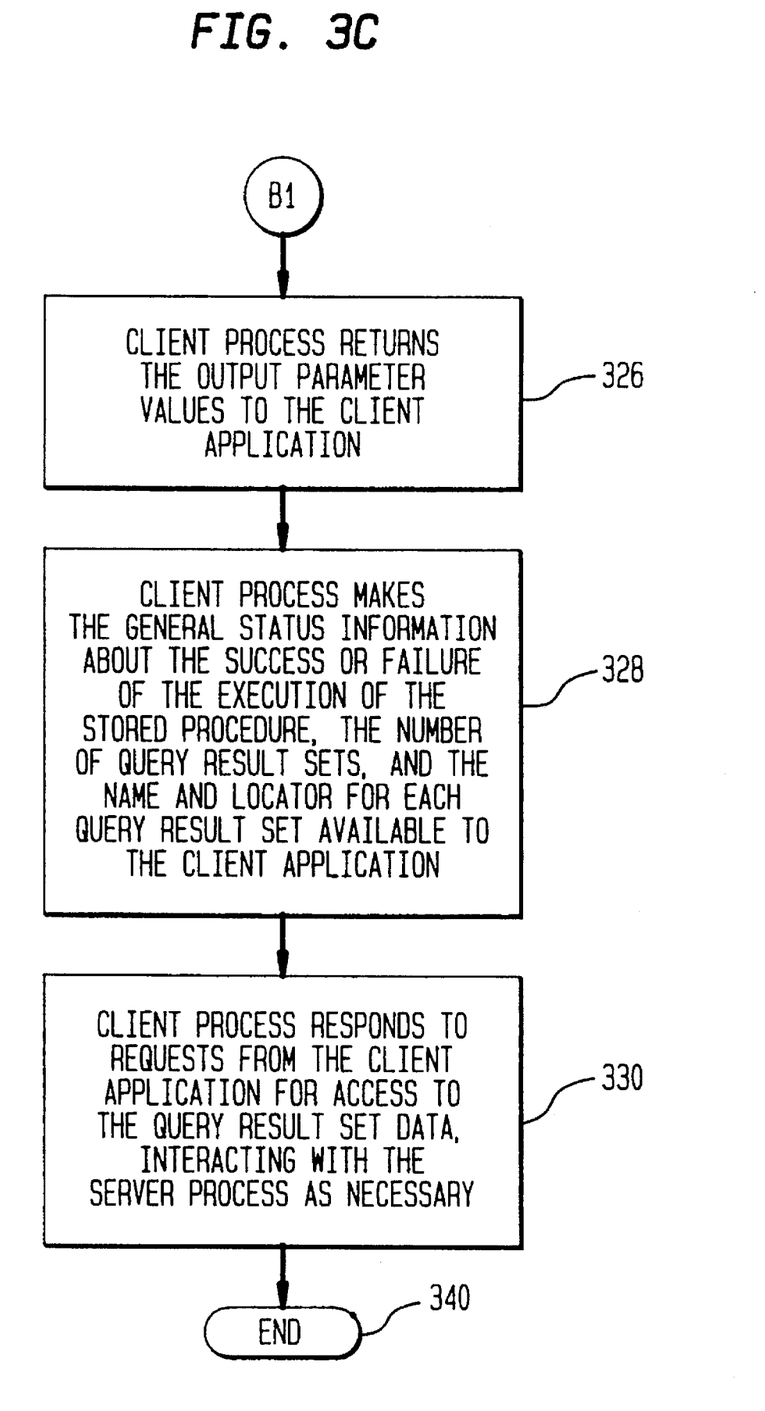

The operation of the present invention shall now be described with reference to a flowchart 302 illustrated in FIGS. 3A–3C. Flowchart 302 begins with step 304, where control immediately passes to step 306.

In step 306, the client application 106 requests the execution of the stored procedure 118 at the remote server computer system 112. The client application 106 need not have an understanding of the number of query result sets or the characteristics of the query result sets at the time the client application 106 invokes the stored procedure 118.

In step 308, since the request is for the execution of a stored procedure 118 that is not located on the client computer system 104, the request is forwarded to the client process 108 at the client computer system 104 for further processing. The client process 108 may be instantiated at this time, or may already be running.

In step 310, the client process 108 establishes a connection over the communication medium 110 to the server process 114 at the server computer system 112 where the stored procedure 118 is located. The server process 114 may be instantiated at this time, or may already be running.

In step 312, the client process 108 constructs and forwards a client process execution request to the server process 114. The client process execution request includes information that: (1) specifies the name of the stored procedure to be executed; (2) indicates that the client process 108 is prepared to receive one or more query result sets; and (3) specifies certain constraints on the quantity of response data that the client process 108 is capable of handling.

The client computer system 104 includes a finite amount of memory for storing response data (i.e., query result set data) transferred to the client computer system 104 from the server computer system 112. This memory is divided into buffers, called "response data buffers." These constraints specify the quantity of such response data buffers that are available to the client process 108. In particular, these constraints indicate: (a) the size of response data buffers available at the client process 108 (this response data buffer size is denoted as L1); (b) the maximum number of query result sets that the client process 108 is capable of receiving (this maximum number of query result sets is denoted as M1); and (3) the maximum number of extra buffers of answer set data per query result set the client process 108 is capable of receiving (this maximum number of extra buffers of answer set data per query result set is denoted as N1). The values of L1, M1, and N1 are implementation dependent.

In step 314, the server process 114 receives the client process execution request. The server process 114 notes (i.e., stores) the constraints of the client process 108 and invokes the stored procedure 118 identified in the client process execution request.

The execution of the stored procedure 118 is represented by steps 316 and 318. In step 316, as each query in the stored procedure 118 is processed, the stored procedure 118 spawns (instantiates) an asynchronous result set generator 116. (Alternatively, the asynchronous result set generators 116 may be spawned by another entity, such as the server process 114, upon receiving an appropriate message from the stored procedure 118.) Thus, there is one asynchronous result set generator 116 associated with each query (or, equivalently, associated with each query result set). Each result set generator 116 is capable of obtaining upon command buffers of answer set data for a query result set by making requests to the appropriate data repository 120 (i.e., the data repository 120 that was processed by the query associated with the result set generator 116). Thus, if the server process 114 wishes to obtain answer set data for a particular query result set, then the server process 114 issues an appropriate command to the result set generator 116 associated with that particular query result set.

In step 318, the stored procedure 118 executes to completion and, in doing so, generates answer set data for query result sets in the order specified by the logic of the stored procedure 118. Before the execution of the stored procedure 118 completes, the stored procedure 118 transmits a message to the server process 114. This message specifies the order (corresponding to, and preferably identical to, the order in which the query result sets were generated) in which the server process 114 is to return result sets to the client process 108.

In step 320, the server process 114 constructs an initial response to the client process execution request. The server process 114 transmits this initial response to the client process 108 via the communication medium 110.

Figure 4:
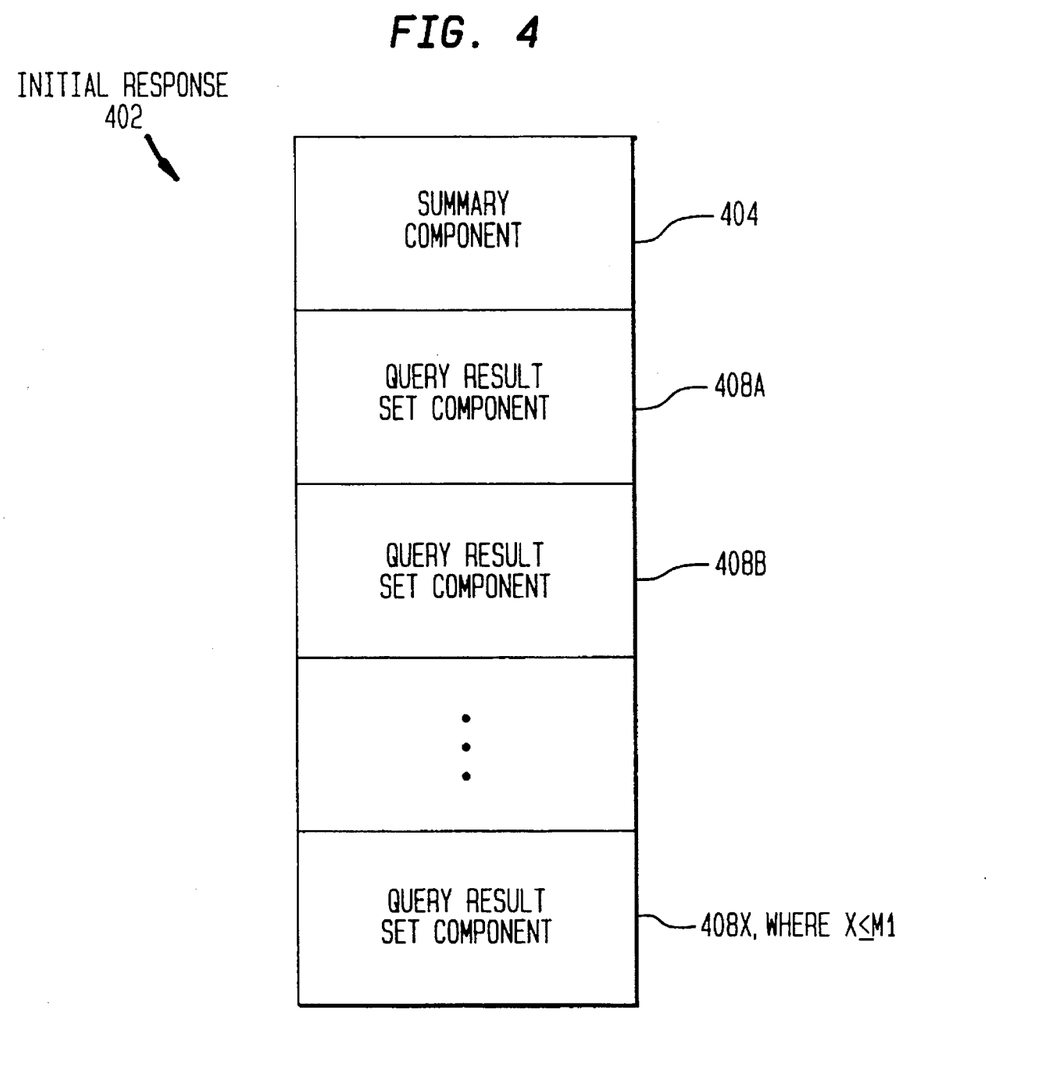
FIGS. 4, 5, and 7 are schematic diagrams of response messages sent from a server process to a client process.

An exemplary initial response 402 is depicted in FIG. 4. The initial response 402 includes a summary component 404 and X query result set components 408, where X is less than or equal to M1, and M1 is equal to the maximum number of query result sets that the client process 108 is capable of receiving (see step 312). The query result set components 408 follow the summary component 404 and are arranged in the order specified by the stored procedure 118 for the return of result sets to the client process 108 (see step 318). The summary component 404 and each query result set component 408 begins a new response data buffer and is made up of a sequence of response data buffers of size L1 (see step 312).

The summary component 404 includes:

(1) A list of unique result set generator identifiers, one identifier for each query result set (and, equivalently, for each result set generator 116), arranged in the order specified by the stored procedure 118 for return of result sets to the client process 108. The list contains at most M1 elements, where M1 is the maximum number of query result sets that the client process 108 is capable of receiving. At a later time, if the client process 108 needs to request additional buffers of answer set data for a query result set on behalf of the client application 106, then the client process 108 identifies the result set of interest by specifying the result set generator identifier that identifies the result set generator 116 associated with the query result set (see step 606 of FIG. 6A, described below).

(2) General status information about the success or failure of the execution of the stored procedure 118.

(3) Output parameter values, if any. These output parameters preferably represent the output parameters of the stored procedure 118 and, thus, are implementation specific (depending on the implementation of the stored procedure 118).

(4) List of groups of additional query result set information, one group in the list for each query result set, arranged in the order specified by the stored procedure 118 for the return of result sets to the client process 108. There are at most M1 groups, where M1 is the maximum number of query result sets that the client process 108 is capable of receiving. Each group includes a name and a locator value. The name for a query result set conveys the semantic of the query result set and is made available to the client application 106 (described below) so that the client application 106 can associate the query result set with the logic (code) in the client application 106 for processing that query result set. The locator value for a query result set is a unique identifier for the query result set that a client application 106 may use to obtain descriptive information about the result set or to access the content of the query result set. In situations where a single client process connects to more than one server process during the execution of a client application, the client process may receive the same locator value from more than one server process. It is the responsibility of the client process to ensure that a locator value returned to a client application is unique for a particular execution of that client application.

Prior to forming the query result set components 408 in the initial response 402, the server process 114 in step 320 interacts with the asynchronous result set generator 116 for each query result set to obtain answer set data for that query result set. The result set generator 116 for each query result set acquires the answer set data by making requests to the appropriate data repository 120. Each data repository 120 generates the answer set data and retains its current position within any query result set that will not be transmitted to the client process 108 in its entirety as part of this initial response 402, so that the additional buffers of answer set data can be prepared and transmitted later if so requested by the client process 108.

Figure 5:
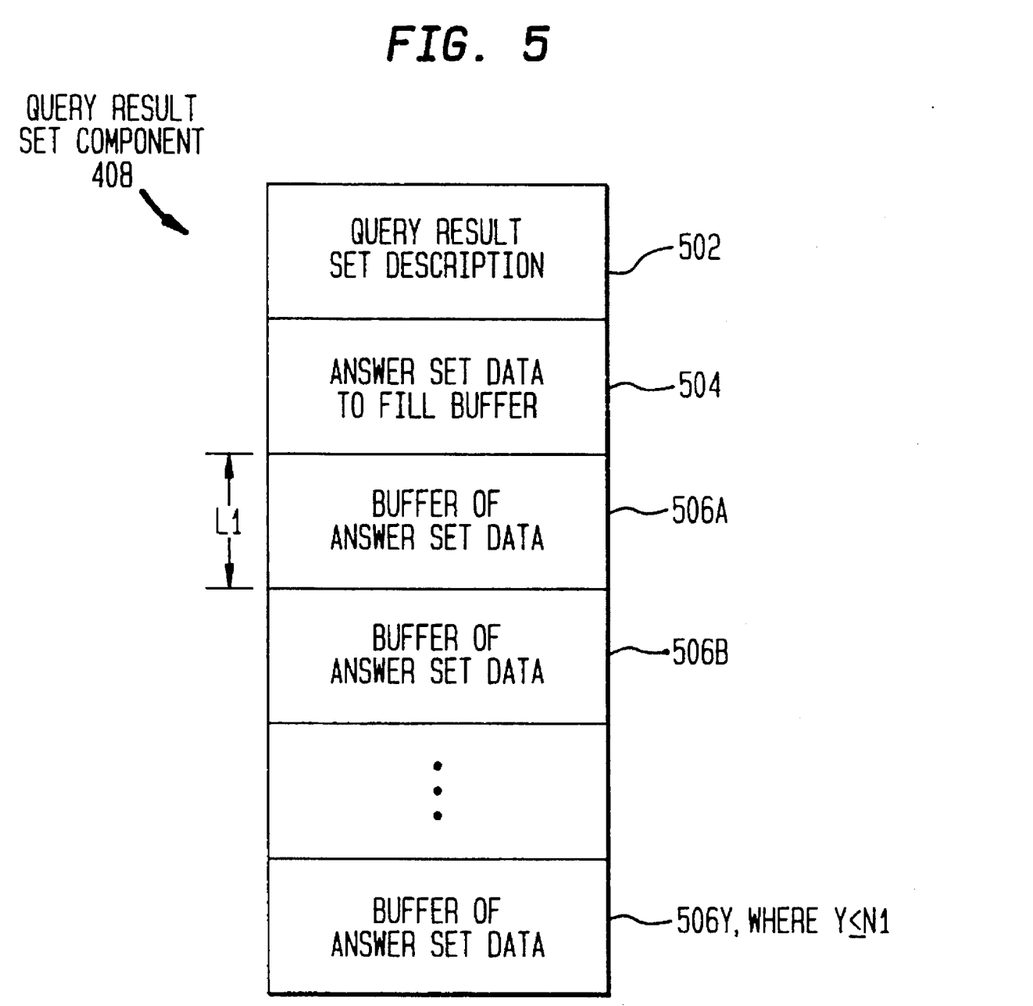

An exemplary query result set component 408 is depicted in FIG. 5. Each query result set component 408 includes (in the following order):

(1) A description of the query result set 502. The description of the query result set 502 defines the layout of the components of each query result set element and the characteristics of the components such as data type, length, whether the component is nullable, etc.

(2) Optionally, a sufficient quantity of answer set data 504 to fill the buffer containing the end of the query result set description 502.

(3) Optionally, a sequence of Y additional buffers 506 of answer set data, where Y is less than or equal to N1, and N1 is equal to the maximum number of extra buffers of answer set data per query result set the client process 108 is capable of receiving. The size of each of the buffers 506 is equal to L1, which is equal to the size of response data buffers available at the client process 108.

In step 322, the client process 108 receives the initial response 402 and processes the summary component 404 of the initial response 402. Since the summary component 404 begins with a list of result set generator identifiers, the client process 108 knows that the execution of the stored procedure 118 resulted in the generation of query result sets and that query result set components 408 follow the summary component 404. The client process 108 retains the list of result set generator identifiers for future use (described below). The client process 108 is now free to prefetch additional buffers of answer set data for a query result set from the server process 108 (by sending an appropriate message to the server process 108, as described below) while the client process 108 concurrently continues to process the initial response 402, and while the client process 108 interacts with the client application 106 (as described below). The client process 108 retains the list of groups of additional query result set information, and associates the nth element of the list of result set generator identifiers with the nth element of the list of groups of additional query result set information.

In step 324, the client process 108 processes the query result set components 408 of the initial response 402. Since the server process 114 constructed the initial response 402 with an understanding of the constraints of the client process 108, the client process 108 is never required to receive more answer set data than the client process 108 is capable of handling. The client process 108 associates the description 502 and the buffers 504, 506 of answer set data for each result set with its result set generator identifier, locator value, and name.

In step 326, the client process 108 forwards the output parameter values stored in the initial response 402, if any, to the client application 106. The manner in which the client application 106 uses these output parameter values is implementation dependent.

In step 328, the client process 108 makes the general status information about the success or failure of the execution of the stored procedure 118, the number of query result sets, and the name and locator information for each query result set available to the client application 106 (the client application 106 can request this information from the client process 108). The contents of the query result sets are not available to the client application 106 prior to the availability of this general status information about the invocation of the stored procedure 118. As discussed above, the name for each query result set conveys the semantic of the query result set and is made available to the client application 106 so that the client application 106 can associate the query result set with logic in the client application 106 for processing that query result set. The locator value for each query result set is a unique identifier for the query result set that the client application 106 may use to obtain descriptive information about the result set or to access the content of the query result set.

In step 330, the client process 108 processes requests from the client application 106 to obtain access to the answer set data for the query result sets. In doing so, the client process 108 may interact with the server process 114 to obtain additional answer set data for one or more of the query result sets. The operations performed during step 330 are depicted in flowchart 602 shown in FIGS. 6A and 6B, which shall now be described.

Figure 6A:
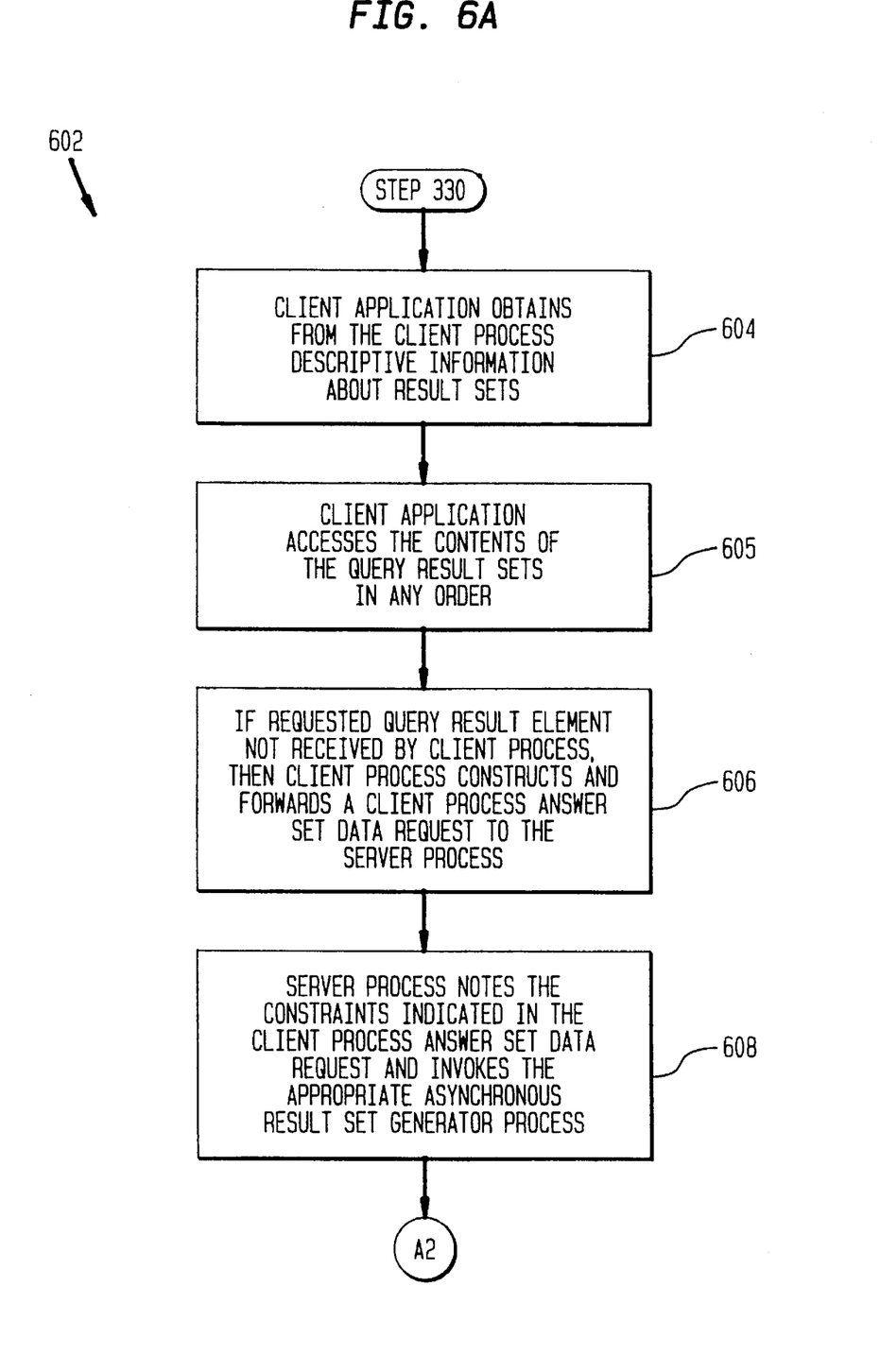

In steps 604 and 605, the client application 106 (upon request to the client process 108) obtains descriptive information about result sets and accesses the contents of the query result sets in whatever order the logic of the client application 106 demands. No additional interaction is required between the client process 108 and the server process 114 for the transmission of additional buffers of answer set data unless the client application 106 issues a request for a query result set element semantically meaningful to the client application 106 that cannot be satisfied by the answer set data already received by the client process 108 from the server process 114.

In step 606, if the client application 106 issues a request (that contains a locator value) for a query result set element that cannot be satisfied by the answer set data already received by the client process 108, then the client process 108 constructs and forwards a client process answer set data request to the server process 114. The client process answer set data request contains information that: (1) specifies the result set generator identifier for the query result set of interest; and (2) specifies certain constraints on the quantity of response data that the client process 108 is capable of handling. The client process 108 selects the correct result set generator identifier from its list of identifiers by picking the result set generator identifier that corresponds to the locator value specified within the client application request. The constraints include: (1) the size of response data buffers available at the client process 108 (this constraint is denoted by L2); and (2) the maximum number of extra buffers of answer set data per query result set the client process 108 is capable of receiving (this constraint is denoted by N2). These constraints may be different than the constraints specified on the client process execution request that invoked the stored procedure 118.

In step 608, the server process 114 receives the client process answer set data request. The server process 114 notes (stores) the constraints of the client process 108 and invokes the asynchronous result set generator 116 identified in the client process answer set data request to obtain the answer set data for the query result set of interest.

In step 610, this result set generator 116 acquires the requested answer set data by making requests to the appropriate data repository 120. The data repository 120 provides the answer set data and retains its current position within any query result set that will not be transmitted to the client process 108 in its entirety as part of this server process response (called the supplemental response), so that the additional buffers of answer set data can be prepared and transmitted later if so requested by the client process 108.

Figure 6B:
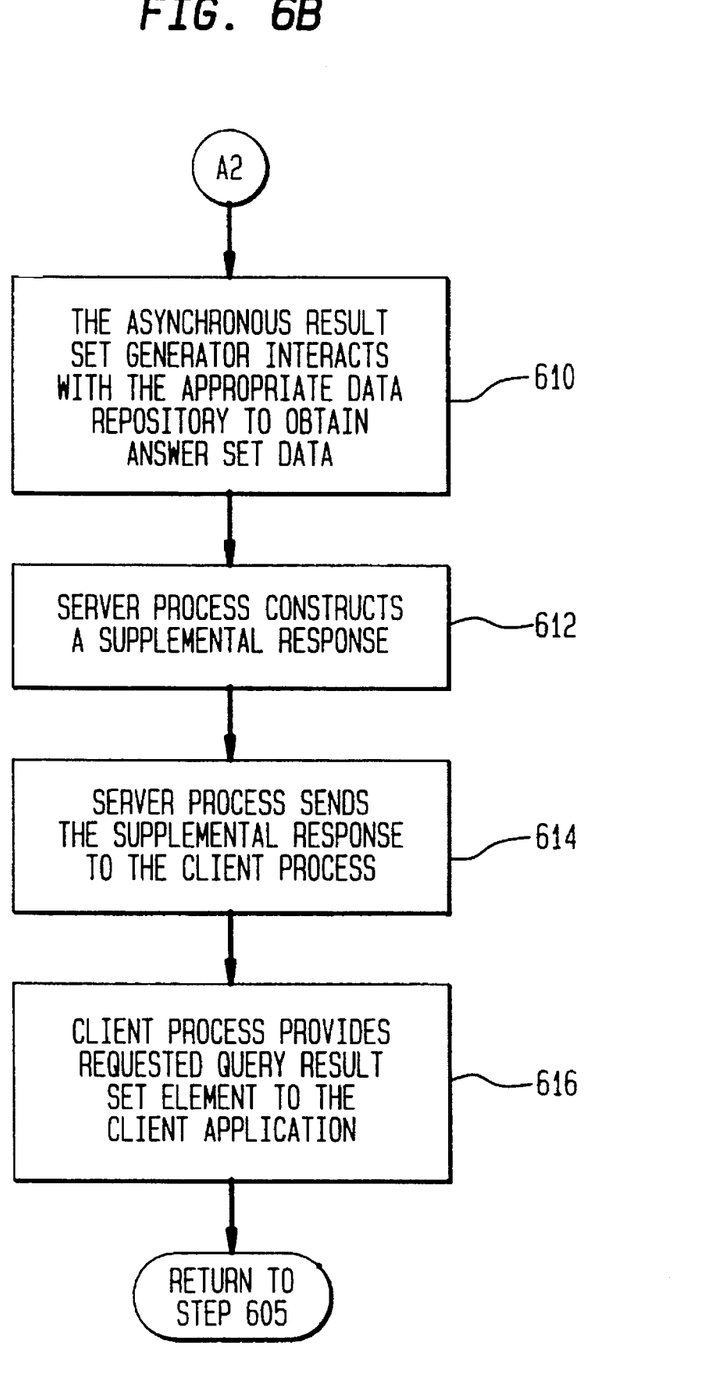
Figure 7:
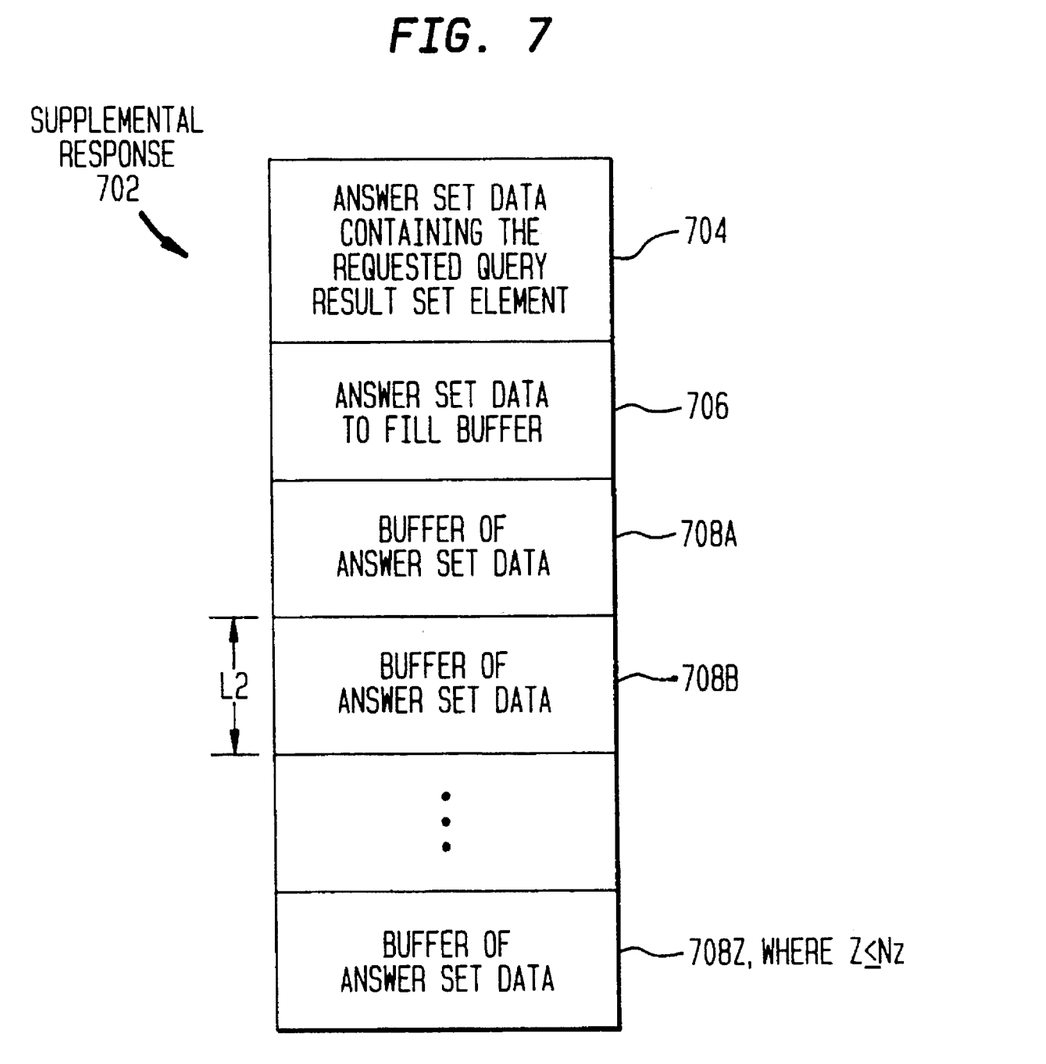

In step 612, the server process 114 constructs the response (called the supplemental response, as opposed to the initial response described above) to the client process answer set data request. An exemplary supplemental response 702 is shown in FIG. 7. The supplemental response 702 includes the following elements (arranged in the following order):
(1) One or more buffers of answer set data 704 containing the next query result set element that is semantically meaningful to the client application 106.
(2) Optionally, a sufficient quantity of additional answer set data 706 to fill the last buffer containing the next query result set element that is semantically meaningful to the client application 106.
(3) Optionally, a sequence of Z additional buffers 708 of answer set data, where Z is less than or equal to N2, and N2 is equal to the maximum number of extra buffers of answer set data the client process 108 is capable of receiving. The size of each of the buffers 708 is equal to L2, which is equal to the size of response data buffers available at the client process 108.

In step 614, the server process 114 sends the supplemental response 702 to the client process 108.

In step 616, the client process 108 receives and processes the supplemental response 702. Since the server process 114 constructed the supplemental response 702 with an understanding of the constraints of the client process 108, the client process 108 is never required to receive more answer set data than the client process 108 is capable of handling. The client process 108 associates the buffers of answer set data for the result set with the locator value for the query result set.

As part of the processing performed in step 616, the client process 108 returns the next query result set element to the client application 106. Control then returns to step 605, to process the next request from the client application 106.

Multi-media Automobile Insurance Claims Application Example

The present invention is useful in many applications. One such application, for example, is a multi-media automobile insurance claims application. When the insured motorist is involved in an auto accident, the claims adjuster uses a multi-media workstation to record information about the claim. The same workstation could be used to review a particular claim.

Information related to an automobile accident claim (that must be stored in the data repositories 120) includes:
(1) Scalar data values:
  (a) The accident case number.
  (b) The insurance policy number.
  (c) The driver's name.
  (d) The driver's address.
  (e) The license number of the vehicle.
  (f) The date of the accident.
  (g) Amount paid to the insured.
(2) Non-scalar data values that might be needed to record details about the claim. Some of these items could be recorded as multiple rows in a traditional relational database:
  (a) A list of the passengers in the insured motorist's car.
  (b) An itemized list of medical charges for each passenger.
  (c) A list of the other vehicles involved in the accident.
(3) There may also be several multi-media objects that need to be stored in the database. These objects might he stored in the form of one or more rows in a relational database that supports multi-media data types:
  (a) A voice recording of the driver's deposition to the insurance adjuster.
  (b) A series of digitized photographs of the damaged car from various angles.
  (c) Digitized copies of repair estimates from auto body shops.

When the insured motorist comes in to the insurance office to review the case, the insurance adjuster uses a multimedia workstation that implements this invention to gather data from the database (from the data repositories 120). This "AUTO_CLAIM" application program that runs on the workstation uses this invention as follows:

(1) The claim review application program 106 prompts the insurance adjuster for the accident case number. This information is used as an input parameter to a relational database stored procedure 118, which could be invoked with the following SQL statement:

```
EXEC SQL

CALL AUTO_CLAIM( :case_num,
                 :driver_name,
                 :driver_address,
                 :accident_date,
                 :amount_paid,
                 :medical_bills,
                 :repair_bills,
                 :driver_deposition,
                 :auto_photos);
```

(2) The AUTO_CLAIM parameter list contains variables for several output parameters as well. Some of the parameters (e.g. driver_name) are scalar values. Other output parameters are multi-media objects or lists that represent one or more rows in the relational database. These output parameters are locators used to access result sets associated with SQL queries that the stored procedure issues on behalf of the multi-media workstation. This example shows the result set locators as parameters of a SQL CALL statement, but this invention can also be applied in cases where the query result set locators are returned outside the CALL statement parameter list.

(3) The client process 108 sends a message to the server computer system 112 containing the SQL CALL statement parameters. Control information is included in the SQL CALL statement message, which is used to control the amount of data returned to the client process 108 from each query result set.

(4) When the SQL CALL statement for the AUTO_CLAIM stored procedure 118 is processed, the scalar data values and a list of the query result sets are returned to the multi-media workstation 104 immediately.

(5) The server process 114 retrieves the required number of data rows from each query result set, and transmits this information along with a description of each query result set to the client process 108. This processing is performed asynchronously. Retrieving and transmitting the query result sets asynchronously is important, because some of the query result sets (e.g. the auto_photos) may be very large. It may take a long time for the relational database to retrieve this data and transmit it to the workstation, so asynchronous processing is used to minimize the response time experienced by the end user.

(6) The data repositories 120 each retains the database position for each query that is not transmitted to the workstation 104 in its entirety, so that the remainder of the query result set can be transmitted later if the data is requested.

(7) It is also important that only a fixed amount of each query result set is returned to the workstation 104 immediately after the CALL statement. The workstation 104 may not require the entire query result, so it is desirable to return only a portion of the result set. In this example, an entire query result set might not be required for these reasons:

The first photo of the vehicle may be sufficient for the adjuster to understand the damage. In this case, the adjuster will probably not choose to play the entire series of auto_photos.

There may be no need to review the driver_deposition, so the adjuster may not need to listen to the audio data.

(8) Another feature of this invention is the ability to process the query result sets in any order. This is valuable in this example, because the insurance adjuster might decide to review the driver_deposition recording before looking at the repair_bills, or vice versa. Similarly, the adjuster may see something unusual in the repair bills that causes him to review the auto_photos, without listening to the driver_deposition first, or the adjuster might review the first auto photo, listen to the driver deposition, and then review one or more additional auto photos.

(9) If the adjuster needs more data from a particular result set than the server returned, the client process 108 automatically transmits a message to the server process 114. This message causes the server process 114 to retrieve and transmit additional data associated with that particular result set.

It should be understood that the invention as described above applies equally well to diverse and non-diverse result sets.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A method for processing result sets, comprising the steps of:

(1) constructing by a client process in a client computer system a client process execution request identifying a stored procedure and specifying constraints on the quantity of response data that said client process is capable of handling;

(2) transmitting said client process execution request from said client process in said client computer system to a server process in a server computer system;

(3) invoking in said server computer system said stored procedure identified by said client process execution request, execution of said stored procedure resulting in the generation of answer set data for a plurality of query result sets;

(4) obtaining answer set data for X of said query result sets in said server computer system, where X is limited by said constraints;

(5) generating in said server computer system an initial response containing, for each of said X query result sets, an amount of said obtained answer set data consistent with said constraints;

(6) transferring said initial response from said server computer system to said client process in said client computer system; and (7) enabling a client application in said client computer system to access and process answer set data of query result sets transferred from said server computer system to said client process in said client computer system in any order.

2. The method of claim 1, wherein said constraints specify:

(a) a size L1 of response data buffers available to said client process;

(b) a maximum number M1 of query result sets that said client process is capable of receiving; and (c) a maximum number N1 of extra buffers of answer set data per query result set that said client process is capable of receiving.

3. The method of claim 2, wherein X is less than or equal to M1.

4. The method of claim 2, wherein step (5) comprises the steps of:

generating a summary component containing general status information about the success or failure of the client process execution request and, for each of said X query result sets, a result set generator identification, a name, and a locator value;

generating X query result set components each corresponding to one of said X query result sets and containing up to N1 extra buffers of answer set data, each of said N1 buffers of answer set data being L1 in size; and concatenating said summary component and said query result set components to thereby generate said initial response.

5. The method of claim 1, wherein step (4) comprises the steps of:

instantiating X asynchronous result set generators, each of said result set generators being capable of retrieving answer set data for one of said X query result sets, said result set generators operating independently of one another; and commanding said result set generators to retrieve answer set data for their respective query result sets.

6. The method of claim 1, wherein step (7) comprises the steps of:

(a) receiving a request from said client application for access to a query result set element;

(b) determining whether said query result set element was previously transferred from said server computer system to said client process in said client computer system; and (c) if said query result set element was previously transferred from said server computer system to said client process in said client computer system, then providing said query result set element to said client application.

7. The method of claim 6, wherein step (7) further comprises the steps of:

(d) if said query result set element was not previously transferred from said server computer system to said client process in said client computer system, then generating a client process answer set data request that identifies a result set generator, and that specifies new constraints on the quantity of response data that said client process is capable of handling;

(e) transmitting said client process answer set data request from said client computer system to said server computer system;

(f) commanding said result set generator identified by said client process answer set data request to retrieve answer set data containing said query result set element for its associated query result set;

(g) generating in said server computer system a supplemental response containing for said associated query result set an amount of said retrieved answer set data consistent with said new constraints;

(h) transferring said supplemental response from said server computer system to said client process in said client computer system; and (i) providing said query result set element to said client application.

8. A client computer system, comprising:

client process execution request constructing means for constructing a client process execution request identifying a stored procedure and specifying constraints on the quantity of response data that can be handled;

client process execution request transmitting means for transmitting said client process execution request to a server process in a server computer system, wherein said server process invokes said stored procedure in said server computer system, execution of said stored procedure resulting in the generation of answer set data for a plurality of query result sets, said server process generating an initial response containing, for each of X query result sets, an amount of said obtained answer set data consistent with said constraints, where X is limited by said constraints, said initial response being transmitted to said client computer system; and enabling means for enabling a client application in said client computer system to access and process answer set data of query result sets transferred from said server computer system to said client computer system in any order.

9. The client computer system of claim 8, wherein said constraints specify:

(a) a size L1 of response data buffers available to a client process executing in said client computer system;

(b) a maximum number M1 of query result sets that said client process is capable of receiving; and (c) a maximum number N1 of extra buffers of answer set data per query result set that said client process is capable of receiving.

10. The client computer system of claim 9, wherein X is less than or equal to M1.

11. The client computer system of claim 8, wherein said enabling means comprises:

means for receiving a request from said client application for access to a query result set element;

means for determining whether said query result set element was previously transferred from said server computer system to said client computer system; and means for providing said query result set element to said client application if said query result set element was previously transferred from said server computer system to said client computer system.

12. The client computer system of claim 11, wherein said enabling means further comprises:

means for generating, if said query result set element was not previously transferred from said server computer system to said client computer system, a client process answer set data request that identifies a result set generator, and that specifies new constraints on the quantity of response data that can be handled;

means for transmitting said client process answer set data request from said client computer system to said server computer system, wherein at said server computer system said result set generator is commanded to retrieve answer set data containing said query result set element for an associated query result set, a supplemental response containing an amount of said retrieved answer set data consistent with said new constraints being generated at said server computer system and transmitted to said client computer system; and means for receiving said supplemental response and providing said query result set element contained therein to said client application.

13. A server computer system, comprising:

client process execution request receiving means for receiving from a client process in a client computer system a client process execution request identifying a stored procedure and specifying constraints on the quantity of response data that said client process is capable of handling;

stored procedure invoking means for invoking said stored procedure identified by said client process execution request, execution of said stored procedure resulting in the generation of answer set data for a plurality of query result sets;

answer set data obtaining means for obtaining answer set data for X of said query result sets, where X is defined by said constraints;

initial response generating means for generating an initial response containing, for each of said X query result sets, an amount of said obtained answer set data consistent with said constraints; and initial response transferring means for transferring said initial response from said server computer system to said client process in said client computer system.

14. The server computer system of claim 13, wherein said constraints specify:

(a) a size L1 of response data buffers available to said client process;

(b) a maximum number M1 of query result sets that said client process is capable of receiving; and (c) a maximum number N1 of extra buffers of answer set data per query result set that said client process is capable of receiving.

15. The server computer system of claim 14, wherein X is less than or equal to M1.

16. The server computer system of claim 13, wherein said initial response generating means comprises:

means for generating a summary component containing general status information about the success or failure of the client process execution request and, for each of said X query result sets, a result set generator identification, a name, and a locator value;

means for generating X query result set components each corresponding to one of said X query result sets and containing up to N1 extra buffers of answer set data, each of said N1 buffers of answer set data being L1 in size; and means for concatenating said summary component and said query result set components to thereby generate said initial response.

17. The server computer system of claim 13, wherein said answer set data obtaining means comprises:

means for instantiating X result set generators, each of said result set generators being capable of retrieving answer set data for one of said X query result sets, said result set generators operating independently of one another; and means for commanding said result set generators to retrieve answer set data for their respective query result sets.

18. The server computer system of claim 13, further comprising:

means for receiving from said client computer system a client process answer set data request that identifies a result set generator, and that specifies new constraints on the quantity of response data that said client process is capable of handling;

means for commanding said result set generator identified by said client process answer set data request to retrieve answer set data containing said query result set element for its associated query result set;

means for generating a supplemental response containing for said associated query result set an amount of said retrieved answer set data consistent with said new constraints; and means for transferring said supplemental response from said server computer system to said client process in said client computer system.

19. The server computer system of claim 13, wherein said answer set data obtaining means asynchronously obtains said answer set data.

* * * * *